(12) United States Patent
Wong et al.

(10) Patent No.: US 7,331,051 B2
(45) Date of Patent: Feb. 12, 2008

(54) SYSTEM AND METHOD FOR INSTALLING PORTABLE DEVICE DRIVERS

(75) Inventors: Yin Hui Wong, Taipei (TW); Cheng Yu Tu, Taipei (TW); Cheen Liao, Taipei (TW)

(73) Assignee: Synology, Inc., Taipei (TW)

( * ) Notice: Subject to any disclaimer, the term of this patent is extended or adjusted under 35 U.S.C. 154(b) by 700 days.

(21) Appl. No.: 10/409,946

(22) Filed: Apr. 8, 2003

(65) Prior Publication Data
US 2004/0205778 A1    Oct. 14, 2004

(51) Int. Cl.
*G06F 13/14* (2006.01)
*G06F 13/38* (2006.01)

(52) U.S. Cl. .................. 719/327; 719/313; 719/321

(58) Field of Classification Search ........ 719/321–327, 719/313
See application file for complete search history.

(56) References Cited

U.S. PATENT DOCUMENTS

| | | | |
|---|---|---|---|
| 5,799,199 A * | 8/1998 | Ito et al. ................. 713/324 |
| 6,668,376 B1 * | 12/2003 | Wang et al. ............... 717/178 |
| 6,745,255 B2 * | 6/2004 | Yen et al. ................. 710/13 |
| 6,754,722 B2 * | 6/2004 | Herzi ..................... 710/8 |
| 6,754,725 B1 * | 6/2004 | Wright et al. ............. 710/8 |
| 6,933,924 B2 * | 8/2005 | Garcia .................... 345/163 |
| 2002/0049883 A1 | 4/2002 | Schneider et al. |
| 2002/0069353 A1 * | 6/2002 | Smith ..................... 713/1 |
| 2003/0046447 A1 * | 3/2003 | Kouperchliak et al. ..... 709/321 |
| 2003/0051084 A1 * | 3/2003 | Rosen ..................... 710/72 |

OTHER PUBLICATIONS

"How to Install Windows 3.1 Drivers in Windows 95". Microsoft Corporation. Published Dec. 17, 2000. Accessed May 4, 2006□□http://support.microsoft.com/kb/132946/EN-US/.*

* cited by examiner

*Primary Examiner*—William Thomson
*Assistant Examiner*—Richard Pantoliano, Jr.
(74) *Attorney, Agent, or Firm*—Perkins Coie LLP (57) ABSTRACT

A method for installing a peripheral device to a computer is disclosed. The peripheral device includes a driver storage formed integral to the peripheral device. The driver storage stores the device driver information. Upon connection to the computer, the peripheral device's driver storage imitates a known disk drive to the computer. The computer can then access the device driver information and install the peripheral device.

11 Claims, 6 Drawing Sheets

FIGURE 5

SYSTEM AND METHOD FOR INSTALLING PORTABLE DEVICE DRIVERS

TECHNICAL FIELD

The present invention relates generally to the installation of peripheral devices onto a computer system, and more particularly, it relates to a device driver installation system that provides an embedded installation method for a peripheral device connected to a computer system.

BACKGROUND

When a new peripheral device of a computer system is connected to a computer, the operating system of the computer generally issues a request asking the user of the peripheral device to install the appropriate device driver for the peripheral device. The user then inserts a disk having stored thereon the device driver. The computer operating system will then automatically execute an auto-run function allowing the user to follow an installation procedure for accomplishing the installation of the device driver onto the computer.

A peripheral device can be connected to the computer by use of a bus, such as a universal serial bus (USB), an IEEE 1394 bus (Firewire), or a peripheral component interconnect bus (PCI). When a peripheral device, such as a printer, scanner, digital camera, disk drive, or any computer recognizable device, is connected, the operating system of the computer first detects the existence of the peripheral device and then checks if the computer has already been installed with the device driver.

In the case where a device driver has not been installed, the host operating system of the computer issues a series of requests for the user to follow an installation procedure. The installation procedure is completed when the host operating system can perform its auto run function to include the peripheral device in the device execution file.

Figure 1:
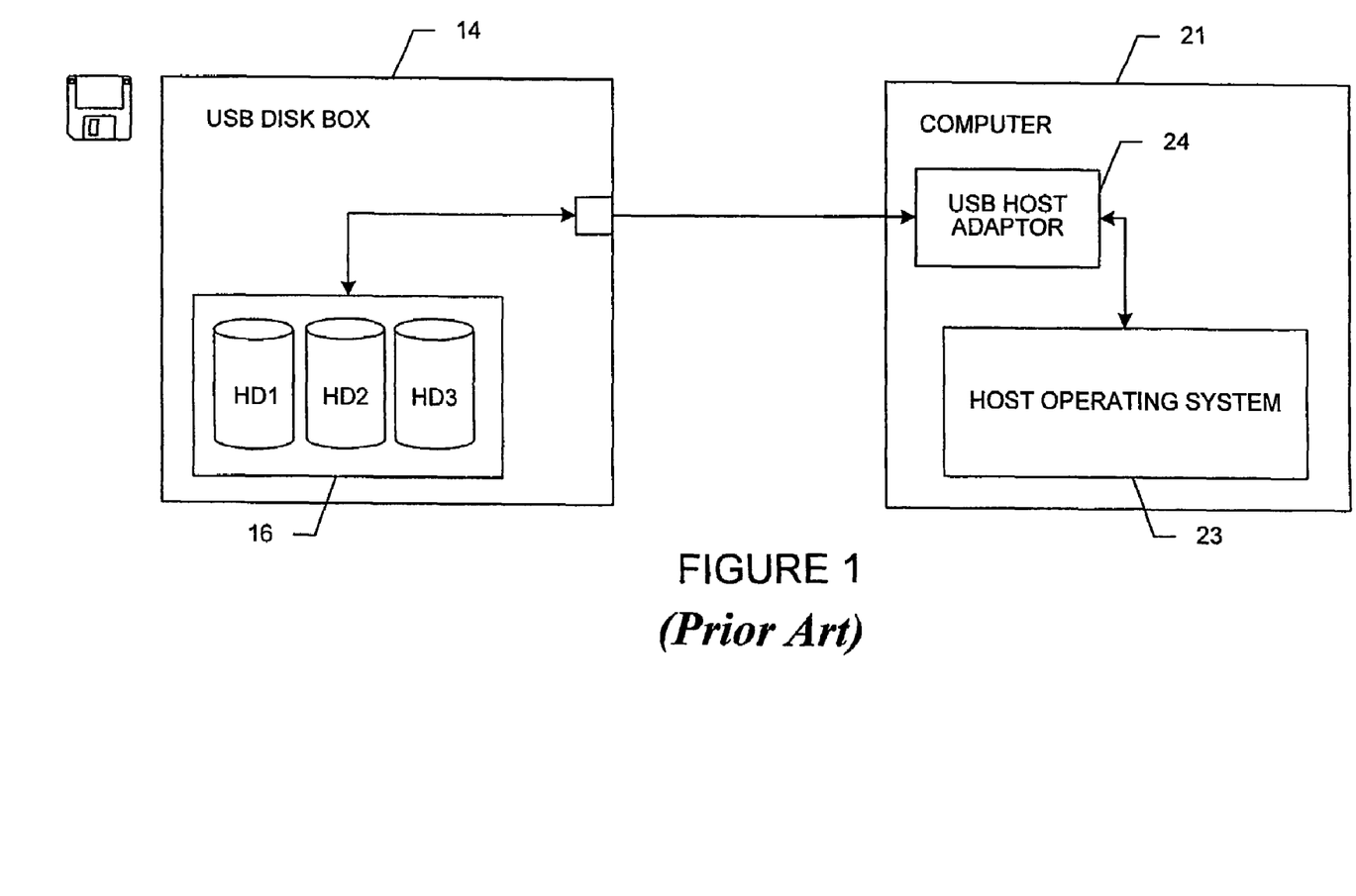
FIG. 1 is a diagram illustrating a conventional method for connecting a USB disk box through the USB bus to the host operating system of a computer.

FIG. 1 illustrates an example of how a USB disk box 14 (as one example of a peripheral device) is installed to a computer system 21 in a traditional way. First, the user connects the USB disk box 14 to the USB (or other bus) adapter 24 of the computer 21. The USB adapter 24 issues a signal to the computer indicating a peripheral device is currently connected to the computer. The USB adapter 24 issues an interrupt signal to the computer 21.

Next, when the computer 21 receives the interrupt signal, it collects the USB installation information from the I/O ports of the USB adapter 24, and if the peripheral device is new, then it issues an inquiry command to the USB adapter 24. Then, the USB adapter 24 issues an inquiry command to the USB disk box 14 using the USB communication protocol, and the USB disk box 14 returns, as depicted in FIG. 1, a value indicating there are three disk drives in the disk box 14. Since a disk device is a piece of fundamental peripheral equipment of any computer system, the host operating system 23 simply takes these three new added disk drives as general storage devices.

"However, it should be noted that the user typically has to manually install a software program such as volume management software to the computer 21 for the control of the new added disk drives, such as for RAID (Redundant Array of Inexpensive Disks) 5 control."

Traditionally, each peripheral device has associated therewith a detached storage disk that stores the device driver and the instructions for its installation. It is not uncommon for peripheral devices to be moved from computer system to computer system. Each time the peripheral device is moved, the user must have the storage disk with the driver information. The storage disk may be lost, or worse yet, a wrong driver may be installed. The installation of a wrong device driver may jeopardize the computer system operation.

In other words, the traditional method of using a storage disk to store the device driver and its installation program makes the installation and/or re-installation of a device driver sometimes problematical. Accordingly, there exists a need for an easy installation system and product for connecting peripheral devices to computer systems with minimum human intervention and no downloading from a storage disk is required.

SUMMARY OF THE INVENTION

The present invention provides a system and product for easy installation of a peripheral device with portable device drivers. Portability is achieved by embedding the device driver and its installation program within the peripheral itself, such that when the peripheral device is connected to a computer system, the installation program can perform an automatic installation or allow users to follow a predefined procedure for easy installation.

Specifically, the portable device driver installation system is stored in an embedded memory (referred to as device driver storage) that is included within the peripheral device. The portable device driver installation system provides an easy installation of drivers associated with the peripheral device when it is connected to the host operating system of a computer through the computer's external and/or internal buses. The portable device driver installation system also provides means for upgrading the peripheral device driver from a computer by downloading the upgraded device driver to the host operating system of the computer and replacing the old device driver stored in the peripheral device by the upgraded one. Therefore, the embedded memory is reprogrammable.

In accordance with one aspect of the invention, the portable device driver installation system provides a programmed procedure to communicate with the host operating system of a computer. In one embodiment of the present invention, the programmed procedure consists of a series of steps, comprising: sending a request signal from the peripheral device to the host operating system for installation; acknowledging the request by the host operating system; responding with signals by the peripheral device to indicate a dummy storage device with name recognizable by the host operating system is currently stored with the peripheral device driver; enabling the peripheral device driver and the dummy storage device in the computer; installing and binding the peripheral device driver into the computer; disabling the dummy storage device with name in the computer; and providing the service of the peripheral device driver for the computer thereafter.

In accordance with another aspect of the invention, the portable device driver installation system also provides a manual operation procedure for the installation in case when the host operating system of a computer cannot execute its auto-run function. The manual operation procedure consists of a series of steps, comprising: requesting by the host operating system the user to select the file path that leads to the dummy storage device with name; installing the peripheral device driver from the dummy storage device with name and binding the peripheral device driver by the host operating system; disabling the dummy storage device by the portable device driver installation system; and providing the service of the peripheral device driver for the computer thereafter.

In accordance with yet another aspect of the invention, the portable device driver installation system provides means for upgrading the peripheral device driver through the external and/or internal buses of a computer. The procedure for upgrading consists of a series of steps, comprising: downloading the upgraded peripheral device driver to the operating system of a computer; installing and binding the downloaded device driver, the upgraded one, into the computer by its host operating system; issuing a message from the computer to the peripheral device for taking the action for upgrading; opening the dummy storage device with name by the portable device driver installation system; replacing the existed device driver by the upgraded device driver to store in the dummy storage device with name; disabling the dummy storage device with name by the portable device driver installation system; and providing the service of the upgraded peripheral device driver for the computer thereafter.

Accordingly, this invention provides a product for easy installation of a peripheral device driver through the connection of the peripheral device to the external and/or internal buses of a computer. The external bus may be, for example, the universal serial bus (USB), IEEE 1394 bus, small computer system interface (SCSI), and other similar buses. The peripheral devices that connect to the computer external bus may include, for example, a disk drive, digital video camera, cellular phone, or personal data assistant (PDA). The internal bus may be, for example, a peripheral component interconnect (PCI) bus, and the peripheral devices that connect to PCI bus may be, for example, sound cards, RAID cards, and video capture cards.

"In the drawings, identical reference numbers identify identical or substantially similar elements or acts. To easily identify the discussion of any particular element or act, the most significant digit or digits in a reference number refer to the Figure number in which that element is first introduced."

DETAILED DESCRIPTION

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of embodiments of the invention.

Figure 2:
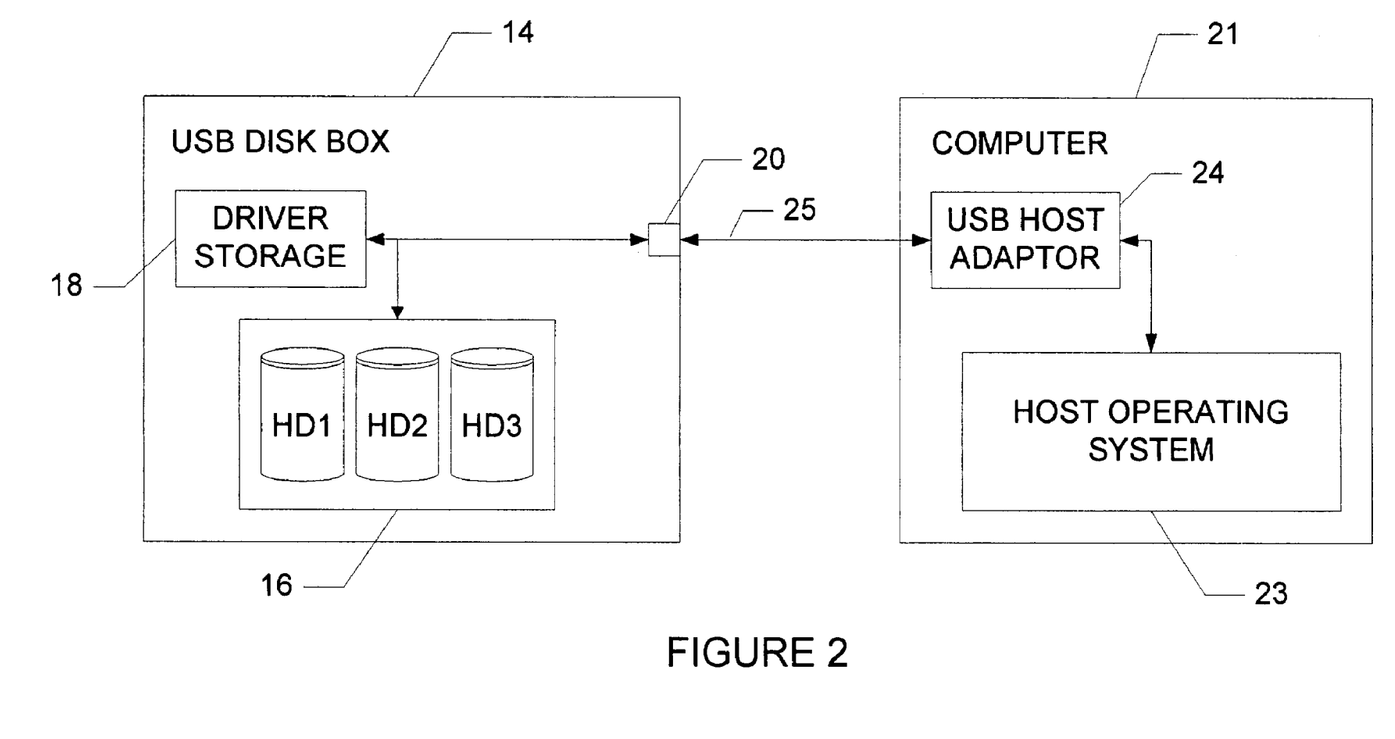
FIG. 2 is a diagram showing the connection of a portable device driver stored in a USB disk box to the host operating system of a computer through the USB bus in accordance with the present invention.

FIG. 2 illustrates a USB disk box 14 that provides a portable device installation system according to one embodiment of the present invention. The USB disk box 14 has driver storage 18 to store the portable device driver and its installation program. The driver storage 18 is connected with the device USB port 20 as a part of the USB device box 16. When the USB port 20 is connected to the USB host adaptor 24 of the computer 21 via USB bus 25, the host operating system 23 of the computer performs the installation of the portable device driver. One example may be a volume manager that drives the three disks 16 for a RAID 5 control. The installation is according to a predetermined procedure stored in the driver storage 18.

The driver storage 18 may take any number of memory forms, such as a flash memory or a compact flash device. In addition, in some embodiments, the driver storage 18 may be a hard drive or optical storage medium. While not necessary, in some embodiments, the driver storage 18 may be rewritable to allow for updating of the device driver.

Figure 3A:
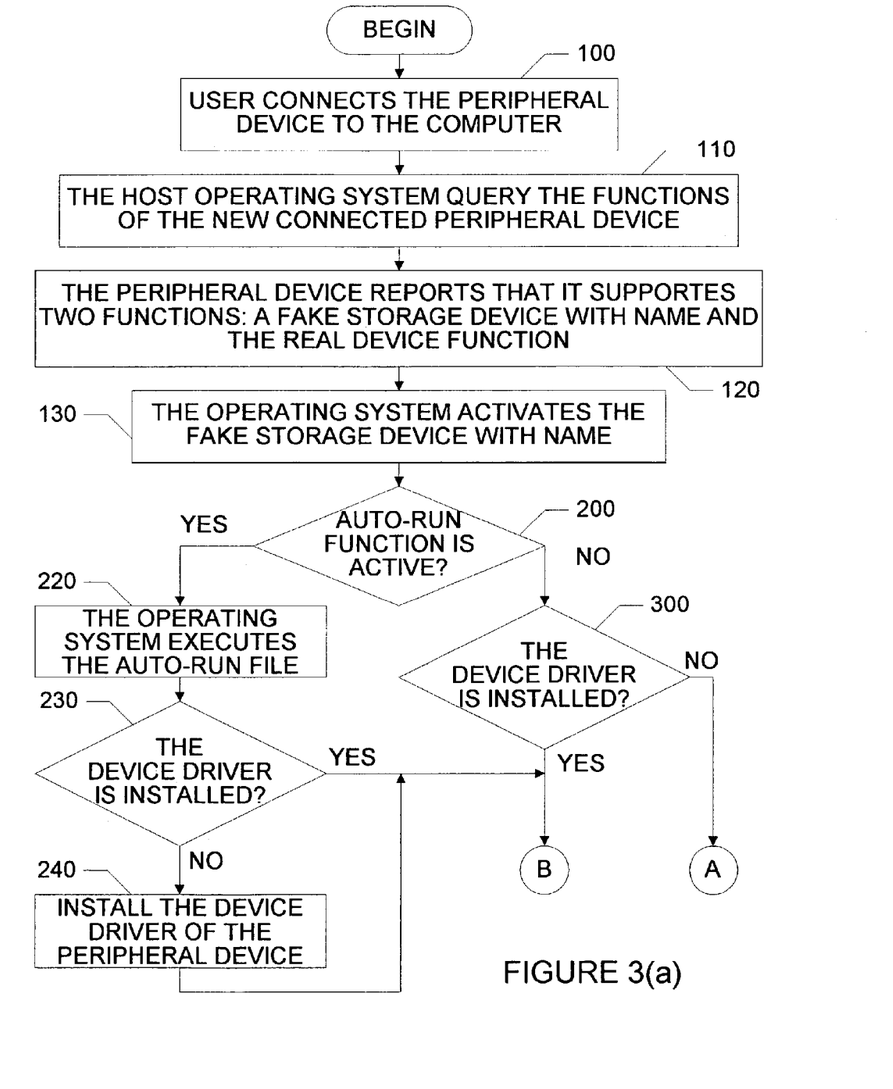
FIG. 3(a)–3(c) are flow charts depicting a system for the installation of a portable device driver in accordance with the present invention.

FIG. 3 shows the procedure of the portable device driver installation system. It should be noted that the description is in connection with a USB bus, however, the same or similar procedure can be used with any of the external or internal buses. As shown in FIG. 3(a) at block 100, the procedure starts when the peripheral device 14 connects to the USB bus 25 of the computer 21. At block 110, when the host operating system 23 detects a new connection of a peripheral device 14 to the computer 21, it starts to perform the inquiry function of the peripheral device 14 according to the protocol specified in the device hardware.

Then, at block 120, the peripheral device 14 responds that it can provide two functions: a dummy storage device with a name that is already recognizable by the host operating system 23 and a portable device driver associated with the peripheral device 14. Thus, the dummy storage device 18 appears to the computer as a recognizable disk drive to "fool" the computer into looking at the dummy storage device 18 for the device driver.

"Next, at block 130, the host operating system then binds both the dummy storage device and the portable device driver together to enable the execution of the portable device driver installation system of the present invention. As is known in the art, prior to a peripheral device being operable, a computer must first bind the peripheral device with its associated device driver. After a peripheral is bound with its device driver, the computer can utilize the peripheral device via the device driver."

At block 130, the portable device driver installation system detects whether the host operating system currently provides the auto-run function for file execution. In the case when the auto-run function is active in the host operating system 23, then, at block 220, the host operating system 23 of the computer 21 starts to execute the auto-run function. In the case when there is no auto-run function or the auto-run function is currently inactive in the host operating system 23 of the computer 21, then at block 300, the portable device driver installation system inquires the host operating system 23 if the portable device driver has ever been installed in the computer 21.

Figure 3B:
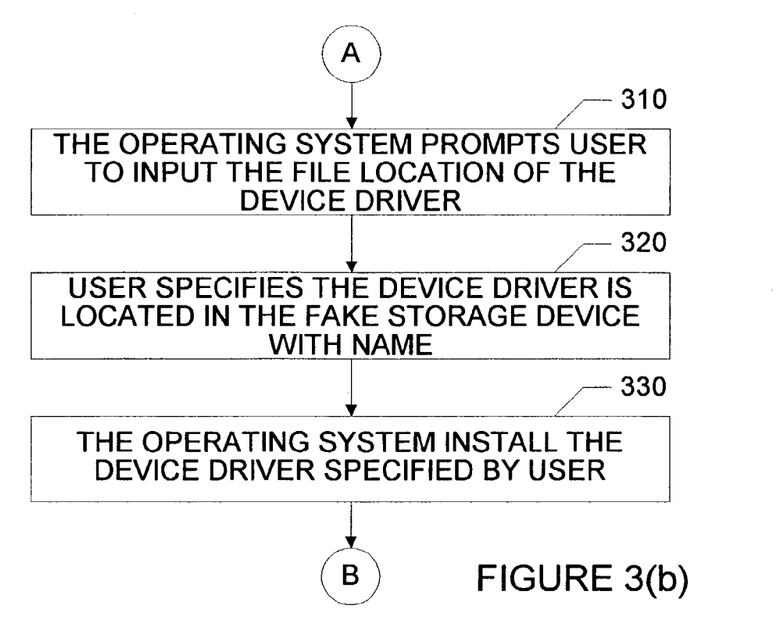
Figure 3C:
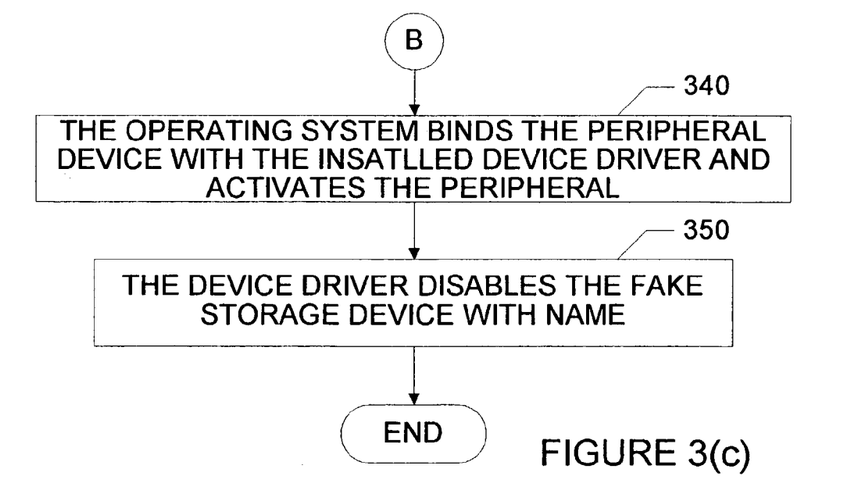

If both the auto-run function is currently unavailable and the portable device driver has not been installed, then the portable device driver installation system switches to a manual operation procedure shown in FIG. 3(b). Otherwise, if the auto-run function is currently unavailable but the portable device driver exists in the computer 21 then the portable device driver installation system switches to FIG. 3(*c*).

At block 230, when the host operating system 23 detects the fact that the portable device driver does not exist in the computer 21, at block 240, then the host operating system 23 executes the auto-run function for the installation of the portable device driver. Otherwise, if the host operating system 23 detects that the portable device driver already exists in the computer 21, then it skips the auto-run execution and switches to FIG. 3(*c*).

FIG. 3(*b*) illustrates a manual operation procedure for the installation of the portable device driver embedded in the peripheral device 14. As seen in FIG. 3(*b*) at block 310, the manual operation procedure starts by asking the user to load in the portable device driver to the computer 21. Then, at block 320, the user assigns the portable device driver to replace the dummy storage device in the file path of the computer 21. Specifically, in one embodiment, the computer will prompt the user that a new peripheral device has been found. At that point, the user will be asked by the computer to specify the location of the device driver for the new device by entering the path. This results in, at block 330, the host operating system 23 of the computer 21 executing the installation of the portable device driver according to the replaced file path.

FIG. 3(*c*) illustrates the processing steps after the completion of the procedure shown in FIG. 3(*a*) or FIG. 3(*b*). At FIG. 3(*c*) block 340, the host operating system 23 binds the portable device driver into the computer 21. So that, as shown in block 350, when the operating system 23 enables the portable device driver and disables the dummy storage device, the computer 21 can provide the service of the portable device driver.

Figure 4:
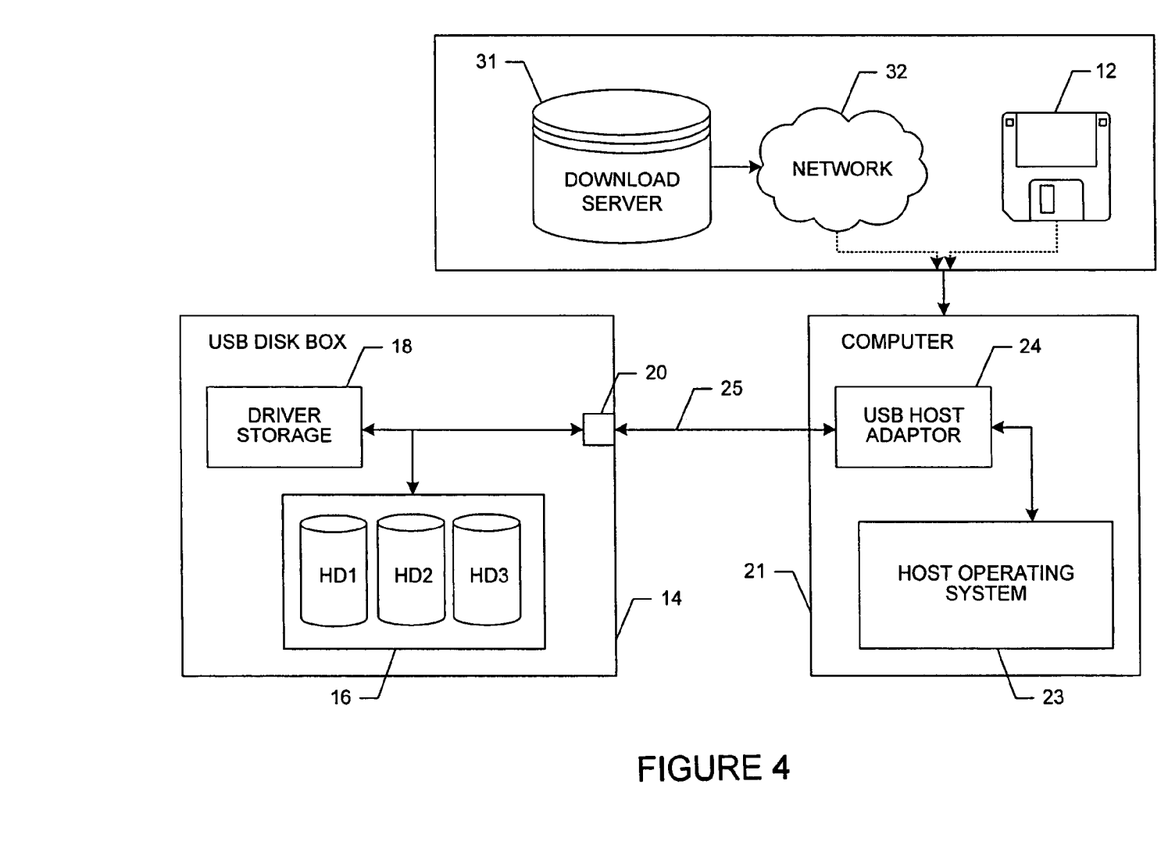
FIG. 4 is a diagram showing the upgrade of a portable device driver through networking in accordance with the present invention.

FIG. 4 illustrates a USB disk box that provides an upgradeable device installation system. The up-to-date portable device driver installer can be downloaded from a download server 31 via network 32 (such as the Internet or alternatively a LAN or WAN) or retrieved from a floppy 33. After the upgraded device driver installer is downloaded to the host operation system 23 from the download server 31 or from the floppy 33, the user can execute the downloaded upgraded device driver installer. The host operation system 23 first disables the device driver of the peripheral device 14, replaces the device driver of the peripheral device 14 in the host operating system with the new driver from download server 31 or floppy 33, and re-enables the device driver of the peripheral device. The driver storage 18 is activated by the host operating system 23 for updating the portable device driver, then, the driver storage 18 is deactivated.

Figure 5:
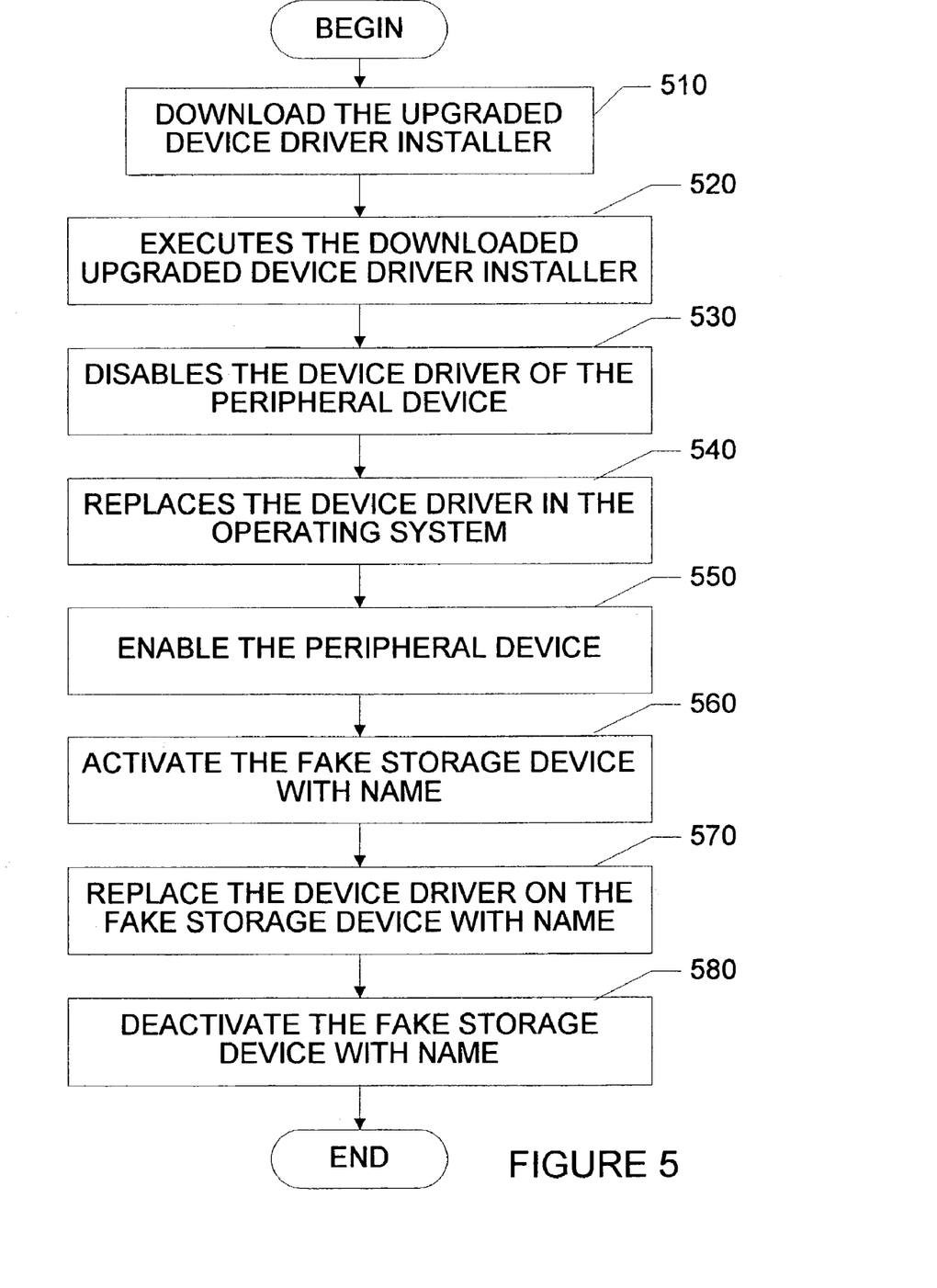
FIG. 5 is a flow chart depicting a system for the upgrade of a portable device driver in accordance with the present invention.

FIG. 5 shows the procedure of the upgrade of a portable device driver. First, at block 510, the user downloads the upgraded device driver installer from the download server 31 or floppy 33 to computer 21. Then, at block 520, the user can execute the downloaded upgraded device driver installer. Next, at block 530, the current portable device driver in the host operating system 23 is disabled. Then, at block 540, the portable device driver in the host operating system 23 is replaced with the downloaded upgraded portable device driver. Then, at block 550, the upgraded portable device driver is enabled again to provide services.

Further, during the portable device driver on the driver storage 18 upgrading process, at block 560, the driver storage 18 is activated before, at block 570, the portable device driver is replaced by the upgraded portable device driver. Then, at block 580, the driver storage 18 is deactivated again and this finishes the upgrading process.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular words, respectively. Additionally, the words "herein," "above," "below," and words of similar import, when used in this application, shall refer to this application as a whole and not to any particular portion of this application.

The above description of illustrated embodiments of the invention is not intended to be exhaustive or to limit the invention to the precise form enclosed. While specific embodiments of, and examples for, the invention are described herein for illustrative purposes, various equivalent modifications are possible within the scope of the invention, as those skilled in the relevant art will recognize.

We claim:

1. An apparatus for installation of a peripheral device drivers into a computer, comprising:
    a) means for sending a request signal from a peripheral device to an operating system of the computer;
    b) means for detecting an acknowledgement by the operating system of the request issued from the peripheral device;
    c) means for responding with a message indicating and presenting the peripheral device to the operating system as both a dummy storage device as well as a portable device, wherein said operating system enables the portable device and the dummy storage device, and further indicating to said operating system that there is an auto-run file in said dummy storage device;
    d) means for checking, by the host operating system, if the operating system can automatically execute the auto-run file stored in the dummy storage device;
    e) means for installing, by the host operating system, the peripheral device driver stored in the dummy storage device when an auto-run function of the operating system is active;
    f) means for binding, by the host operating system, the peripheral device driver to the portable device;
    g) means for reverting, by the host operating system, to a manual operation procedure when the auto-run function is inactive; and
    h) means for deactivating, by the host operating system, the dummy storage device.

2. The apparatus of claim 1, wherein said means for operating a manual procedure to continue the installation of the peripheral device driver when the auto-run function of the host operating system is inactive, comprises:
    a) means for checking, by the host operating system, if the peripheral device driver already exists in a file path of the computer;
    b) means for binding, by the host operating system, the peripheral device driver in the file path of the computer with the portable device;
    c) means for requesting, by the host operating system, a user to select a file path that leads to the dummy storage device;
    d) means for copying, by the host operating system, the peripheral device driver stored in the dummy storage device to the computer;
    e) means for binding, by the operating system, the peripheral device driver to the portable device; and
    f) means for deactivating, by the host operating system, the dummy storage device.

3. The apparatus of claim 1, wherein said means for upgrading a peripheral device driver through the external and/or internal buses of a computer comprises:
   a) means for downloading an upgraded peripheral device driver to the computer;
   b) means for disabling, by the host operating system, the portable device;
   c) means for replacing, by the host operating system, the existing peripheral device driver by the upgraded peripheral device driver;
   d) means for enabling, by the host operating system, the portable device;
   e) means for activating, by the host operating system, the dummy storage device;
   f) means for replacing, by the host operating system, the peripheral device driver in the dummy storage device with the upgraded peripheral device driver; and
   g) means for deactivating, by the host operating system, the dummy storage device.

4. A method for installing a peripheral device onto a computer, said peripheral device having integrated therewith a dummy storage device for storing a peripheral device driver, the method comprising:
   (a) sending a request signal from the peripheral device to an operating system of the computer;
   (b) detecting an acknowledgement from the operating system of the request signal;
   (c) responding with a message indicating and presenting the peripheral device to the operating system as both said dummy storage device and a portable device, wherein said computer enables the portable device and the dummy storage device, and further indicating to said operating system that there is an auto-run file in said dummy storage device;
   (d) checking if the host operating system can automatically execute the auto-run file of the dummy storage device;
   (e) installing, by the host operating system, the peripheral device driver stored in the dummy storage device when an auto-run function of the operating system is active;
   (f) binding, by the host operating system, the peripheral device driver to the portable device;
   (g) reverting, by the host operating system, to a manual operation procedure when the auto-run function is inactive; and
   (h) deactivating, by the host operating system, the dummy storage device.

5. The method of claim 4, wherein said means for operating a manual procedure to continue the installation of the peripheral device driver when the auto-run function of the host operating system is inactive operates by:
   (1) checking, by the host operating system, if the peripheral device driver already exists in a file path of the computer;
   (2) binding, by the host operating system, the peripheral device driver when the peripheral device driver does exist in the file path of the computer;
   (3) requesting, by the host operating system, a user to select a file path that leads to the dummy storage device;
   (4) copying, by the host operating system, the peripheral device driver stored in the dummy storage device to the computer;
   (5) binding, by the operating system, the peripheral device driver copied from the dummy storage device to the portable device; and
   (6) deactivating, by the host operating system, the dummy storage device.

6. The method of claim 4, wherein the manual operation for the installation of said peripheral device driver into said computer further comprises:
   a) checking, by the host operating system of the computer, if the peripheral device driver is already in a file path of the computer;
   b) binding the peripheral device driver with the portable device when the peripheral device driver exists in the file path of the computer; or
   c) requesting a user to select a file path that leads to the dummy storage device;
   d) installing and binding the peripheral device driver stored in the dummy storage device with the portable device; and
   e) disabling the dummy storage device by the host operating system.

7. The method of claim 4, further including upgrading the peripheral device driver via an external connector connected to the bus to the computer by:
   a) downloading an upgraded peripheral device driver to the computer;
   b) disabling, by the host operating system, the portable device;
   c) replacing, by the host operating system, the existing peripheral device driver with the upgraded peripheral device driver;
   d) enabling, by the host operating system, the portable device; and
   e) triggering, by the host operating system, the activation of the dummy storage device.

8. The method of claim 4, wherein the peripheral device that connects to the bus of said computer is selected from the group consisting of disk drives, video digital cameras, cellular phones, personal digital assistants, sound cards, RAID (Redundant Array of Inexpensive Disks) cards, and video catchers.

9. A computer storage medium containing instructions for performing the method of claim 4.

10. A method for installing a peripheral device onto a computer, comprising:
    detecting a connection of the peripheral device to the computer;
    performing inquiry of the detected peripheral device;
    recognizing and enabling the peripheral device as both a disk drive and a portable device, the disk drive containing a driver for the portable device;
    determining whether an auto-run function is available on the computer;
    if the auto-run function is available, then executing the auto-run function to install the driver for the portable device;
    if the auto-run function is unavailable, determining whether the computer already contains the driver for the portable device;
      if the computer already has the driver for the portable device, binding the driver with the portable device and activating the portable device; and
      if the computer does not contain the driver for the portable device, then requesting and accepting a file path that leads to the dummy storage device, copying the driver stored in the dummy storage device to the computer, and binding the driver copied from the dummy storage device to the portable device.

11. A computer storage medium containing instructions for performing the method of claim 10.

* * * * *